(12) United States Patent
Liu

(10) Patent No.: US 8,303,000 B2
(45) Date of Patent: Nov. 6, 2012

(54) QUICK RELEASE CONNECTOR

(76) Inventor: Hsiu-Hsiung Liu, Jhonghe (TW)

( * ) Notice: Subject to any disclaimer, the term of this patent is extended or adjusted under 35 U.S.C. 154(b) by 247 days.

(21) Appl. No.: 12/881,132

(22) Filed: Sep. 13, 2010

(65) Prior Publication Data

US 2012/0061953 A1    Mar. 15, 2012

(51) Int. Cl.
*F16L 37/00*    (2006.01)

(52) U.S. Cl. .................. 285/277; 285/1; 137/614.05

(58) Field of Classification Search .............. 285/1, 277, 285/276; 137/614.05, 614.06, 614
See application file for complete search history.

(56) References Cited

U.S. PATENT DOCUMENTS

| | | | | |
|---|---|---|---|---|
| 2,536,702 | A * | 1/1951 | Scheiwer | 285/1 |
| 3,140,072 | A * | 7/1964 | Scinto, Jr. | 285/277 |
| 3,336,053 | A * | 8/1967 | Carse | 285/1 |
| 5,540,250 | A * | 7/1996 | Mullins | 285/1 |
| 5,967,491 | A * | 10/1999 | Magnuson et al. | 251/149.6 |
| 6,279,874 | B1 * | 8/2001 | Nyberg | 137/614.05 |
| 6,908,118 | B2 * | 6/2005 | Fumioka | 285/277 |
| 8,191,932 | B2 * | 6/2012 | Davis | 285/277 |

FOREIGN PATENT DOCUMENTS

JP    2010-065764 A    3/2010

OTHER PUBLICATIONS

English Abstract of JP 2010-065764 A.

* cited by examiner

*Primary Examiner* — David E Bochna
(74) *Attorney, Agent, or Firm* — Hershkovitz & Associates LLC

(57) ABSTRACT

A quick release connector has a body, a sealing valve and an outer sleeve. The body is hollow, is manufactured as a single piece and has a connecting end, a holding end, an air inlet chamber, a mounting recess, an air outlet chamber, multiple ball holes, multiple releasing holes, a returning spring and multiple balls. The sealing valve is movably mounted in the body. The sealing valve selectively abuts a sealing ring of the body and has an external surface, a closed end, an open end, at lease one air inlet and a pressing ring. The outer sleeve is slidably mounted around the body and has a mounting end, a pushing end, an internal surface, a spring recess, an abutting recess, a holding recess and a pressing spring.

10 Claims, 9 Drawing Sheets

QUICK RELEASE CONNECTOR

BACKGROUND OF THE INVENTION

1. Field of the Invention

The present invention relates to a connector, and more particularly to a quick release connector that can be manufactured conveniently to reduce the cost of production and the fault rate of the quick release connector and can be used safely and maintained easily.

2. Description of Related Art

With reference to FIG. 9, a conventional quick release connector 70 is used in pipe connections and comprises a body 71, a socket base 72, a sealing valve 73 and an outer sleeve 74. The body 71 is hollow and has an interior and two ends. One of the ends of the body 71 is connected to an air compressor. The socket base 72 is connected to the other end of the body 71 and has an external surface, multiple ball holes 721 and multiple balls 722. The ball holes 721 are formed through the external surface of the socket base 72 at intervals. The balls 722 are held respectively in the ball holes 721 in the socket base 72. The sealing valve 73 is movably mounted in the body 71 and has an air inlet 731 communicating with the interior of the body 71. The outer sleeve 74 is slidably mounted around the socket base 72 and abuts the balls 722 of the socket base 72. A pressing spring 741 is mounted between the outer sleeve 74 and the body 71.

However, the body 71 and the socket base 72 of the conventional quick release connector 70 are two separate elements and need to be manufactured separately. Thus, the cost and time of manufacturing the conventional quick release connector 70 is increased. Additionally, the body 71 and the socket base 72 are connected to each other by threads, but this is inconvenient to assemble. Furthermore, the pressured air of the air compressor may leak from the threaded segments between the body 71 and the socket base 72 and cause danger in operation.

In addition, when a plug is inserted into the conventional quick release connector 70, the balls 722 can hold the plug firmly with the socket base 72 to transmit the pressured air from the air compressor to the plug. To separate the plug from the body 71 of the conventional quick release connector 70, the outer sleeve 74 is pushed relative to the socket base 72 so that the balls 722 can be separated from the plug. When the plug is separated from the socket base 72, the sealing valve 73 does not move back to the original position and the pressured air could still flow into the plug via the air inlet 731. Then, the impulsive force of the pressured air may push the plug shooting out of the socket base 72 and could hurt people.

The quick release connector in accordance with the present invention mitigates or obviates the aforementioned problems.

SUMMARY OF THE INVENTION

The main objective of the invention is to provide a quick release connector that can be manufactured conveniently, reducing the cost of production and the fault rate of the quick release connector and can be used safely and maintained easily.

The quick release connector in accordance with the present invention has a body, a sealing valve and an outer sleeve. The body is hollow and is manufactured as a single piece. The body has a connecting end, a holding end, an air inlet chamber, a mounting recess, an air outlet chamber, multiple ball holes, multiple releasing holes, a returning spring and multiple balls. The sealing valve is movably mounted in the body. The sealing valve selectively abuts a sealing ring of the body and has an external surface, a closed end, an open end, at lease one air inlet and a pressing ring. The outer sleeve is slidably mounted around the body and has a mounting end, a pushing end, an internal surface, a spring recess, an abutting recess, a holding recess and a pressing spring.

Other objects, advantages and novel features of the invention will become more apparent from the following detailed description when taken in conjunction with the accompanying drawings.

DETAILED DESCRIPTION OF PREFERRED EMBODIMENT

Figure 1:
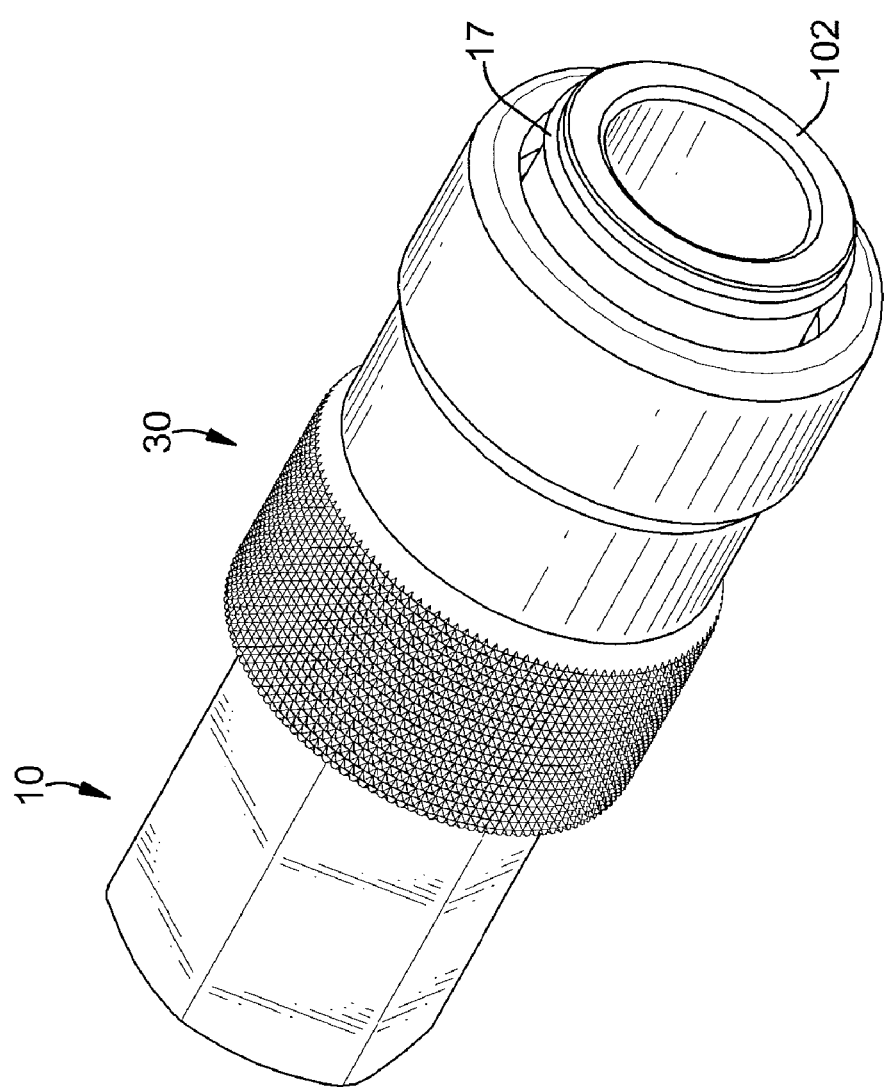
FIG. 1 is a perspective view of a quick release connector in accordance with the present invention.
Figure 2:
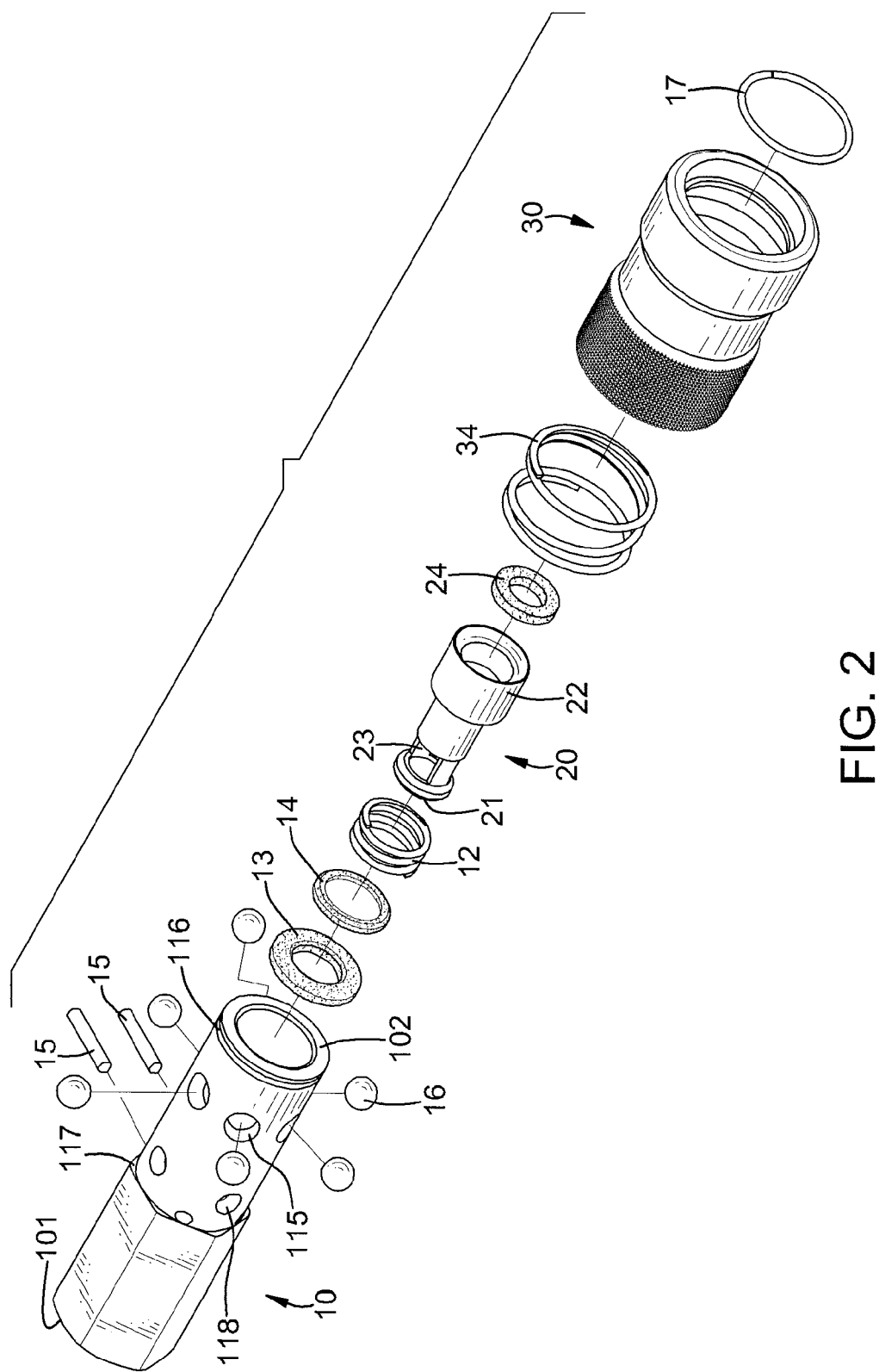
FIG. 2 is an exploded perspective view of the quick release connector in FIG. 1.

With reference to FIGS. 1 to 4, a quick release connector (US standards M-type) in accordance with the present invention comprises a body 10, a sealing valve 20 and an outer sleeve 30.

The body 10 is hollow and is manufactured as a single piece. The body 10 has an external surface, an internal surface, a connecting end 101, a holding end 102, a middle, a threaded segment 111, an air inlet chamber 112, a mounting recess 113, an air outlet chamber 114, multiple ball holes 115, a limiting groove 116, an abutting flange 117, multiple releasing holes 118, a returning spring 12, a sealing ring 13, a washer 14, multiple holding pins 15, multiple balls 16 and a limiting ring 17.

Figure 3:
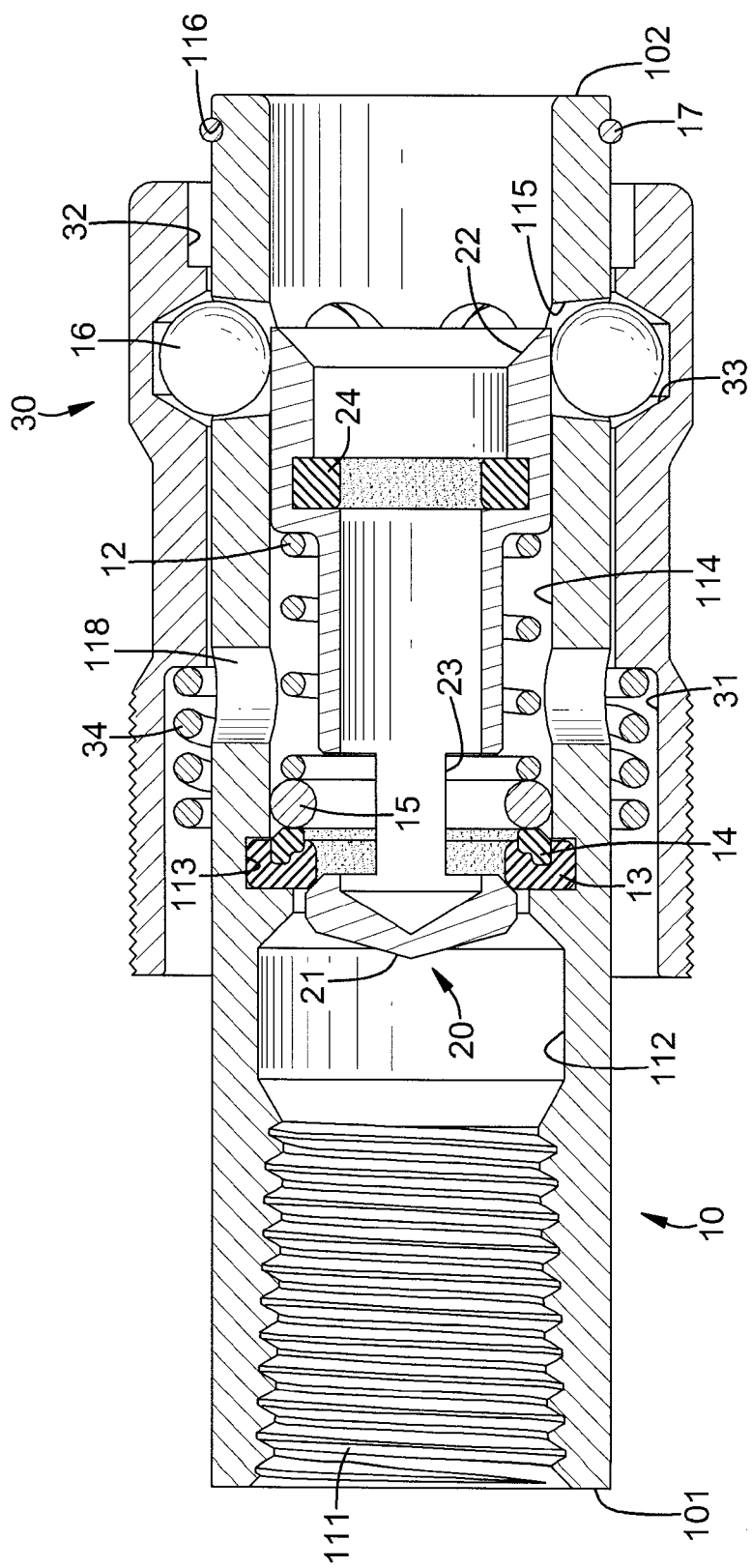
FIG. 3 is a side view in partial section of the quick release connector in FIG. 1.
Figure 8A:
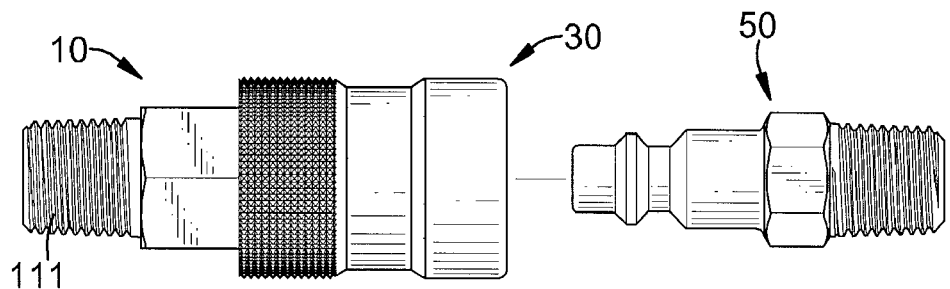
FIG. 8A is another operational side view of another embodiment of a quick release connector in accordance with the present invention showing another plug being inserted into the connectors.
Figure 8B:
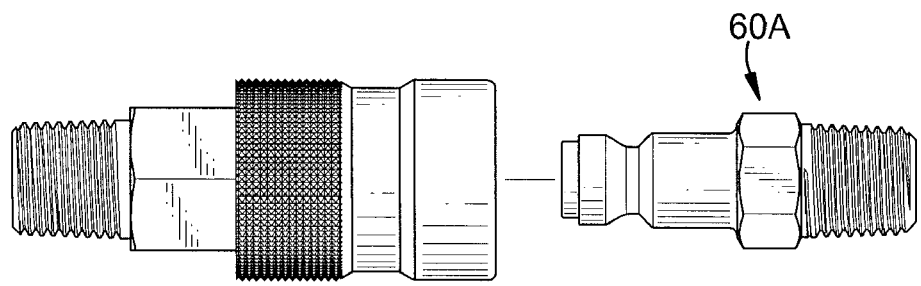
FIG. 8B to 8D are operational side views of a quick release connector in accordance with the present invention showing different types of plugs being inserted into the connectors.
Figure 8C:
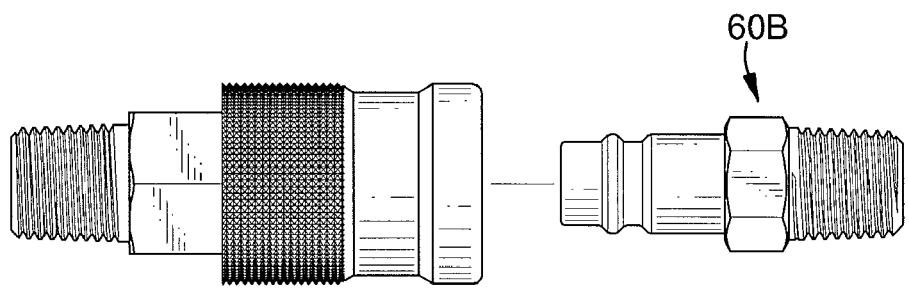
Figure 8D:
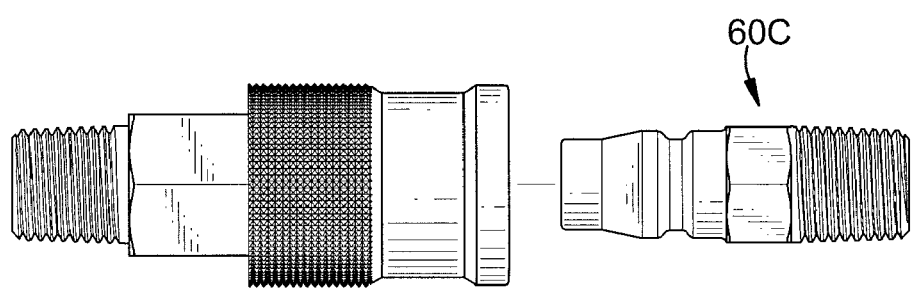
Figure 9:
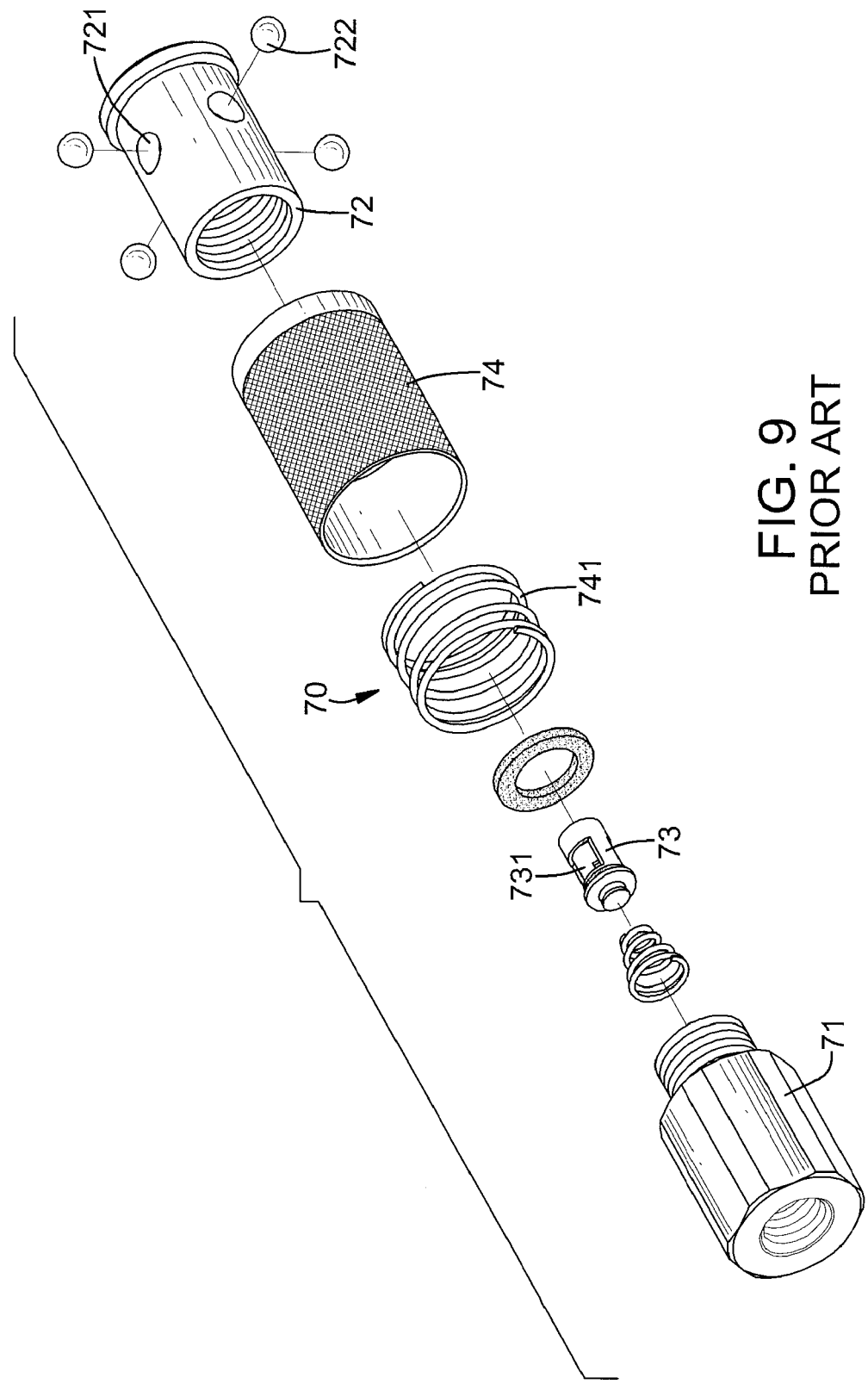
FIG. 9 is an exploded perspective view of a quick release connector in accordance with the prior art.

The connecting end 101 of the body 10 is connected to an air compressor. With reference to FIGS. 5 and 8A to 8D, the holding end 102 of the body 10 is connected to a plug 50, 60A, 60B, 60C. With reference to FIGS. 3 and 8A, the threaded segment 111 is formed in the internal surface of the body 10 near the connecting end 101 or is formed on the external surface of the body 10 near the connecting end 101. The threaded segment 111 is screwed with the air compressor. The air inlet chamber 112 is formed in the body 10 near the connecting end 101 and has a diameter. The mounting recess 113 is formed in the body 10 between the ends, communicating with the air inlet chamber 112 and has an internal surface, a protruding face and a diameter larger than the diameter of the air inlet chamber 112. The protruding face is formed on the internal surface of body 10 at the mounting recess 113 near the air inlet chamber 112.

The air outlet chamber 114 is formed in the body 10 near the holding end 102 and communicates with the mounting recess 113 and the air inlet chamber 112. The ball holes 115 are formed through the external surface of the body 10 at intervals near the holding end 102. The ball holes 115 are arranged in a circle around the body 10 and communicate with the air outlet chamber 114. The limiting groove 116 is formed around the external surface of the body 10 at the holding end 102. The abutting flange 117 is formed on the external surface of the body 10 near the middle. The releasing holes 118 are formed through the external surface of the body 10 at intervals between the abutting flange 117 and the ball holes 115 and communicate with the air outlet chamber 114.

The returning spring 12 is mounted in the body 10 between the mounting recess 113 and the air outlet chamber 114 of the body 10 and has two ends. The sealing ring 13 is mounted in the mounting recess 113 of the body 10 and abuts against the protruding face of the mounting recess 113. The washer 14 is mounted in the mounting recess 113 and abuts the sealing ring 13. The holding pins 15 are securely and transversally mounted in the air outlet chamber 114 of the body 10 to hold the washer 14 and the sealing ring 13 securely in the mounting recess 113. One of the ends of the returning spring 12 abuts the holding pins 15. The balls 16 are respectively held in the ball holes 115 in the body 10. The limiting ring 17 is mounted in the limiting groove 116 of the body 10.

The sealing valve 20 is movably mounted in the body 10. The sealing valve 20 selectively abuts the sealing ring 13 of the body 10 and has an external surface, a closed end 21, an open end 22, at lease one air inlet 23 and a pressing ring 24. The closed end 21 of the sealing valve 20 is enlarged and is mounted in the air inlet chamber 112 of the body 10 and mounted through the sealing ring 13 and the washer 14 to selectively close a passage between the air inlet chamber 112 and the mounting recess 113 of the body 10. The open end 22 of the sealing valve 20 is mounted in the air outlet chamber 114 of the body 10 and communicates with the air outlet chamber 114. The external surface of the sealing valve 20 abuts the balls 16 at the open end 22. The other end of the returning spring 12 abuts the external surface of the sealing valve 20 near the open end 22. The at least one air inlet 23 is formed radially through the external surface of the sealing valve 20 near the closed end 21 and selectively communicates with the air inlet chamber 112 or the air outlet chamber 114. The pressing ring 24 is mounted in the sealing vale 20 near the open end 22.

The outer sleeve 30 is slidably mounted around the body 10 and has a mounting end, a pushing end, an internal surface, a spring recess 31, an abutting recess 32, a holding recess 33 and a pressing spring 34. The mounting end of the outer sleeve 30 is mounted around the body 10 near the middle. The pushing end of the outer sleeve 30 is mounted around the body 10 at the holding end 102. The spring recess 31 is formed in the internal surface of the outer sleeve 30 at the mounting end around the body 10. The abutting recess 32 is formed in the internal surface of the outer sleeve 30 at the pushing end and has a bottom selectively abutting the limiting ring 17 of the body 10 to keep the outer sleeve 30 from escaping from the body 10. The holding recess 33 is formed in the internal surface of the outer sleeve 30 near the abutting recess 32 and holds the balls 16 inside. The pressing spring 34 is mounted around the body 10 in the spring recess 31 and abuts the abutting flange 117 to make the balls 16 hold between the holding recess 33, the ball holes 115 and the external surface of the sealing valve 20 at the open end 22.

Figure 4:
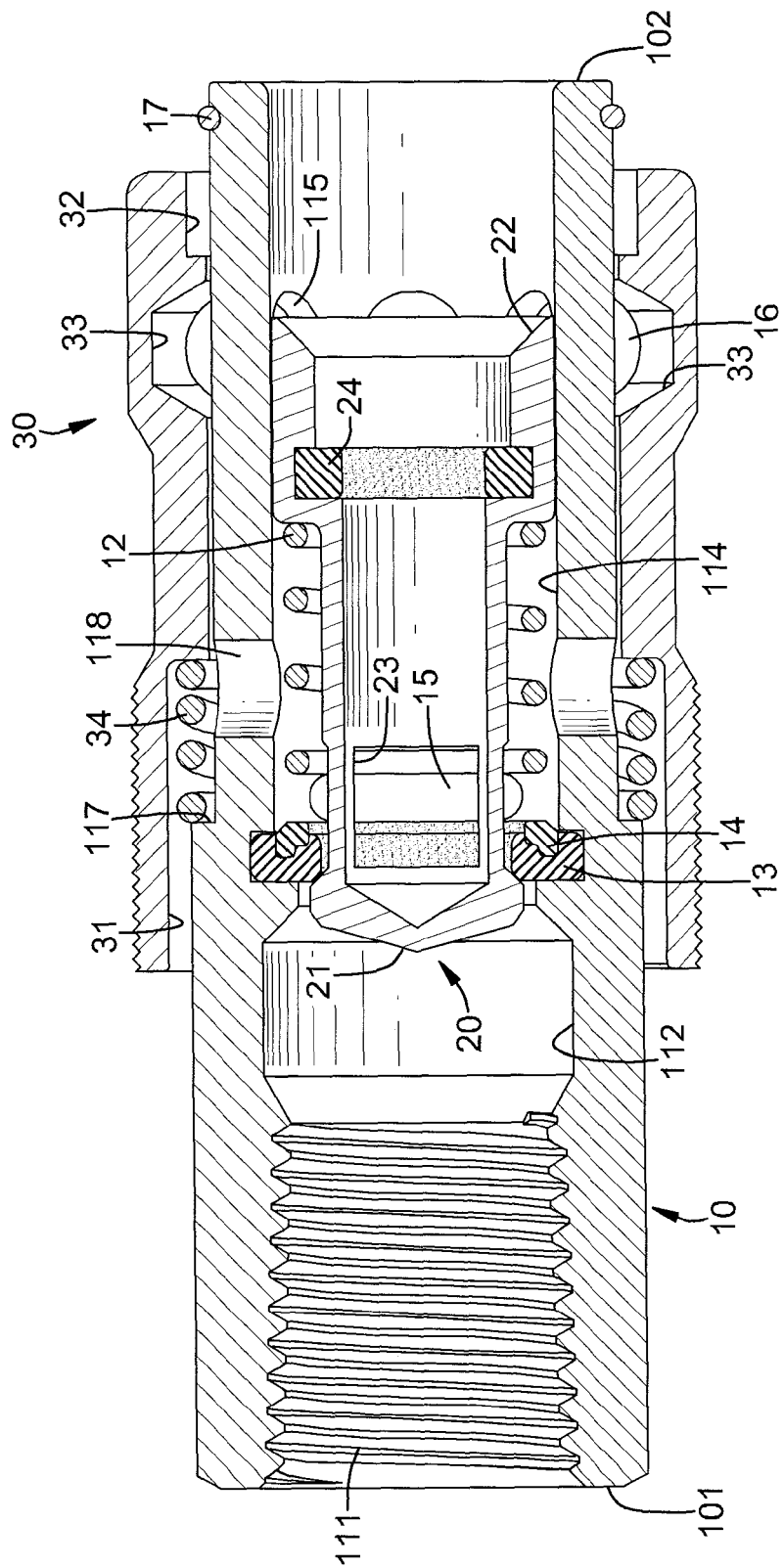
FIG. 4 is another side view in partial section of the quick release connector in FIG. 1.

With reference to FIGS. 3 and 4, when the connecting end 101 of the body 10 is connected to an air compressor and the quick release connector as described is not connected with a plug, the closed end 21 of the sealing valve 20 abuts against the sealing ring 13 to close the passage between the air inlet chamber 112 and the mounting recess 113 of the body 10 by a force of the returning spring 12 and the pressure of the pressured air. The pressured air from the air compressor through the air inlet chamber 112 of the body 10 is blocked by the closed end 21 of the sealing valve 20 and the sealing ring 13 of the body 10 and is kept from leaking.

Figure 5:
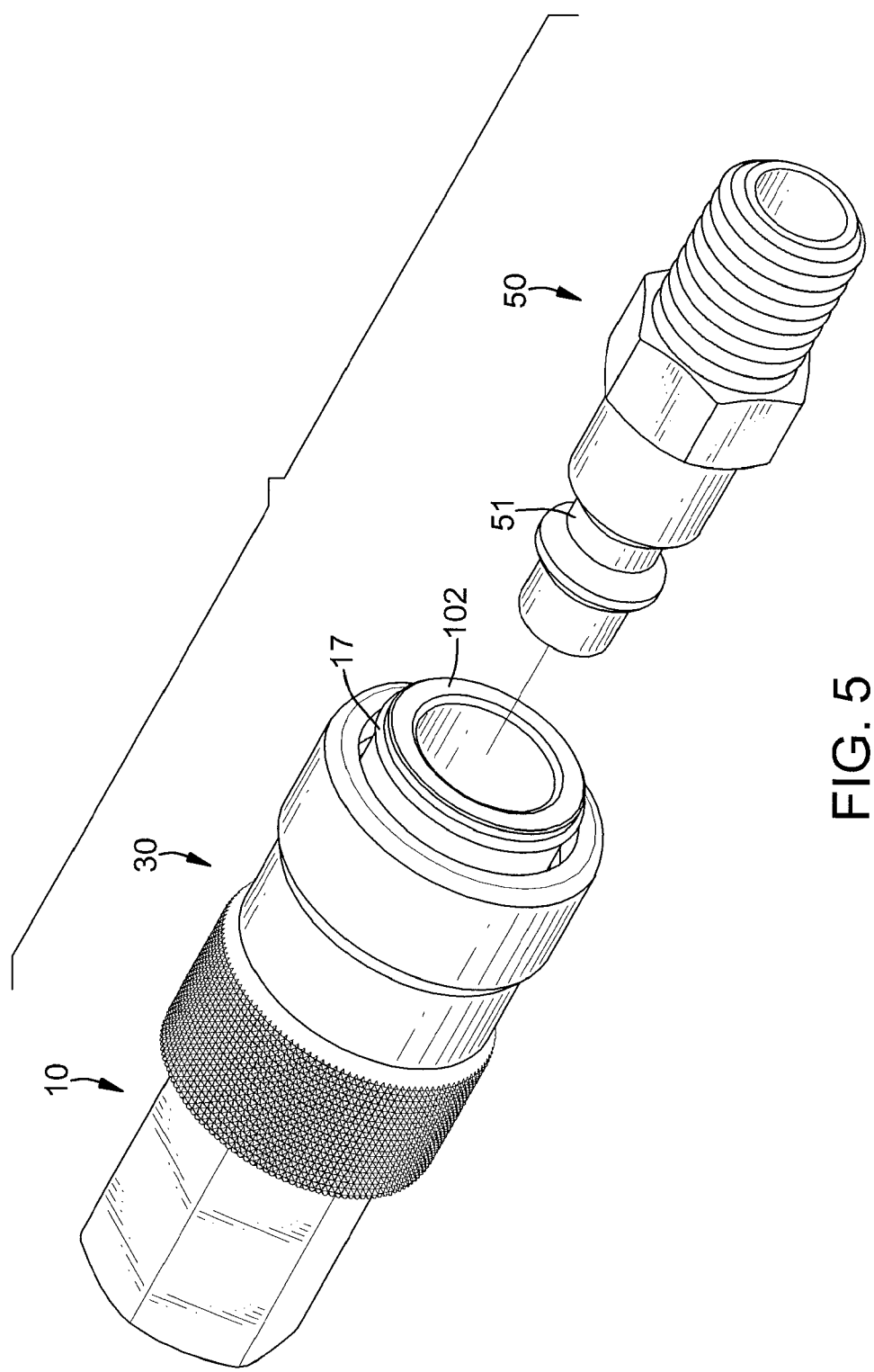
FIG. 5 is an operational exploded perspective view of the quick release connector in FIG. 1 showing a plug being inserted into the connector.
Figure 6:
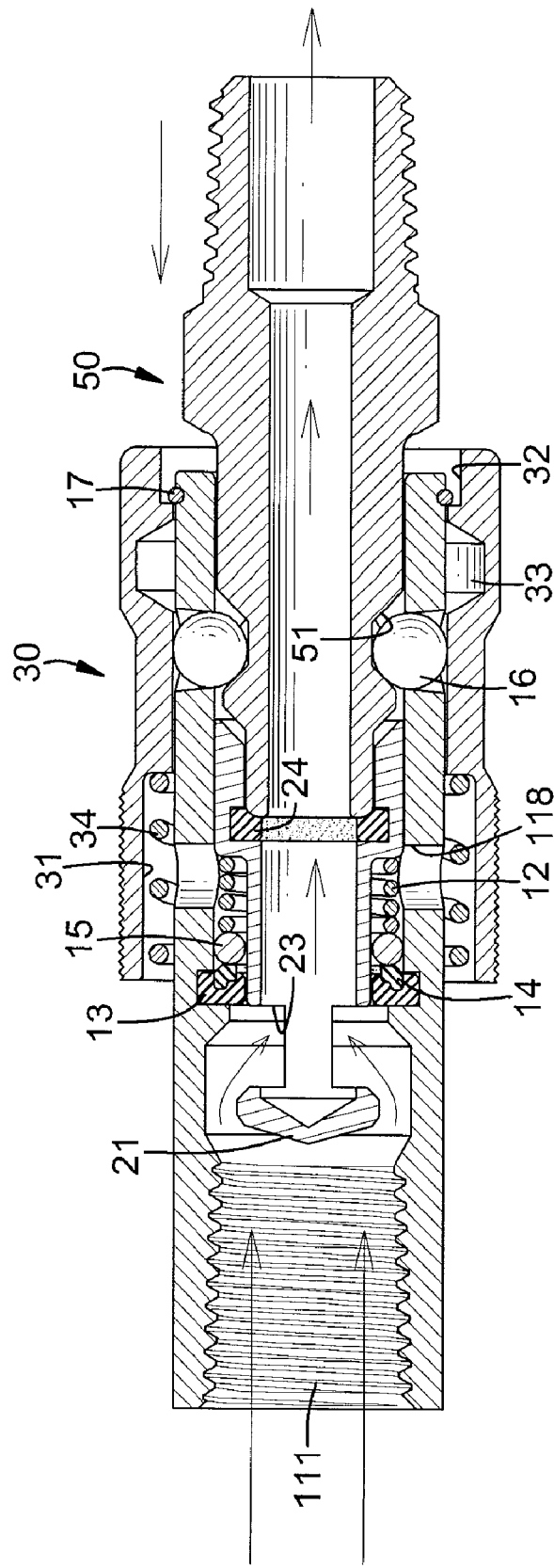
FIG. 6 is an operational side view in partial section of the quick release connector in FIG. 5 showing the plug being inserted into the connector.

With reference to FIGS. 5 and 6, when a plug 50 with an annular engaging recess 51 connected to a tool is inserted into the sealing valve 20 via the holding end 102 and the air outlet chamber 114 of the body 10 to push the pressing ring 24, the outer sleeve 20 is pushed forward to the connecting end 101 of the body 10 to press the returning spring 12 to allow the balls 16 to be separated from the external surface of the sealing valve 20. The outer sleeve 30 will move backward relative to the body 10 to make the bottom of the abutting recess 32 abut the limiting ring 17 by the force provided by the pressing spring 34. At this time, the balls 16 are separated from the holding recess 33 and engage the engaging recess 51 of the plug 50 to hold the plug 50 firmly with the body 10.

When the plug 50 is held on the body 10 by the balls 16 and the engaging recess 51, the plug 50 abuts against the pressing ring 24 and pushes the sealing valve 20 to move relative to the washer 14 and the sealing ring 13 of the body 10 and the returning spring 12 is compressed. Then the closed end 21 of the sealing valve 20 leaves away from the sealing ring 13 to allow the pressured air to flow into the plug 50 via the at least one air inlet 23 of the sealing valve 20. Thus, the pressured air will flow into the tool that is connected with the plug 50 via the body 10 and the plug 50.

Figure 7:
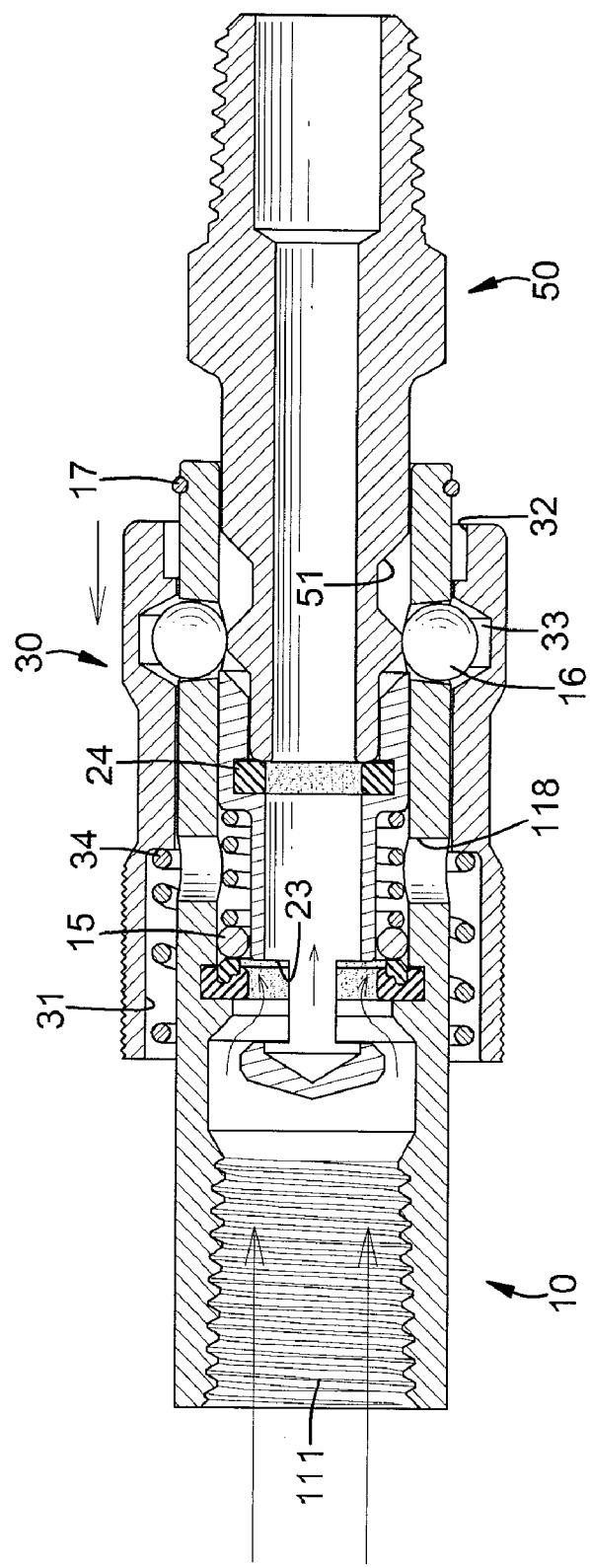
FIG. 7 is an operational side view in partial section of the quick release connector in FIG. 5 showing the plug being separated from the connector and the connector being unsealed.

With reference to FIG. 7, to separate the plug 50 from the body 10 of the quick release connector in accordance with the present invention, the outer sleeve 30 is pushed to move forward to the connecting end 101 of the body 10 so that the balls 16 is pushed by an external surface of the plug 50 beside the engaging recess 51 to escape from the engaging recess 51 of the plug 50 and move into the holding recess 33. Thus, the plug 50 can be separated from the holding end 102 of the body 10 easily. When the plug 50 is separated from the body 10, the sealing valve 20 moves back to the original position by the force of the returning spring 12 to make the closed end 21 of the sealing valve 20 abut with the sealing ring 13. When the plug 50 is separated from the body 10, before the sealing valve 20 moves back to the original position, some of the pressured air can flow out of the body 10 via the releasing holes 118 without flowing into the plug 50. The plug 50 will not be pushed to shoot out of the body 10 by the impulsive force of the pressured air and this can prevent the plug 50 from hurting people. In addition, with reference to FIGS. 8B to 8D, different kinds of the plugs 60A (US standards T-type), 60B (DE standards), 60C (JP standards) can be held firmly with the body 10 by the balls 16.

The body 10 is manufactured as a single piece and this can reduce the cost and time of manufacturing and assembling the quick release connector in accordance with the present invention. In addition, the pressure air of the air compressor will not leak from the body 10 and this can prevent the user from getting hurt while connecting the plug 50, 60 with the body 10 of the quick release connector. Further, when the plug 50 is separated from the body 10, the pressured air can flow out of the body 10 by the releasing holes 118 without flowing into the plug 50. Additionally, the quick release connector in accordance with the present invention can be used to connect with different types of the plugs 50, 60A, 60B, 60C.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A quick release connector comprising:
  a body being hollow, being manufactured as a single piece and having
    an external surface;
    an internal surface;
    a connecting end;
    a holding end being adapted to connect with a plug;
    a middle;
    an air inlet chamber formed in the body near the connecting end and having a diameter;
    a mounting recess formed in the body between the ends, communicating with the air inlet chamber and having
      an internal surface;
      a protruding face formed on the internal surface of body between the air inlet chamber and the mounting recess; and
      a diameter being larger than the diameter of the air inlet chamber;
    an air outlet chamber formed in the body near the holding end and communicating with the mounting recess and the air inlet chamber;
    multiple ball holes formed through the external surface of the body at intervals near the holding end, arranged in a circle around the body and communicating with the air outlet chamber;
    multiple releasing holes formed through the external surface of the body at intervals between the middle and the ball holes and communicating with the air outlet chamber;
    a returning spring mounted in the body between the mounting recess and the air outlet chamber of the body and having two ends; and
    multiple balls respectively held in the ball holes in the body;
  a sealing valve movably mounted in the body between the air inlet chamber and the air outlet chamber to selectively close a passage between the air inlet chamber and the air outlet chamber and having
    a closed end being enlarged, mounted in the air inlet chamber of the body to selectively close the passage between the air inlet chamber and the air outlet chamber of the body and abutting one of the ends of the returning spring of the body;
    an open end mounted in the air outlet chamber of the body and communicating with the air outlet chamber;
    an external surface abutting the balls at the open end;
    at least one air inlet formed radially through the external surface of the sealing valve near the closed end and selectively communicating with the air inlet chamber or the air outlet chamber; and
    a pressing ring mounted in the sealing vale near the open end of the sealing valve; and
  an outer sleeve slidably mounted around the body and having
    a mounting end mounted around the body near the middle of the body;
    a pushing end mounted around the body at the holding end of the body;
    an internal surface;
    a spring recess formed in the internal surface of the outer sleeve at the mounting end around the body;
    a holding recess formed in the internal surface of the outer sleeve and selectively abutting the balls; and
    a pressing spring mounted around the body in the spring recess and abutting the middle of the body to make the balls hold between the holding recess, the ball holes and the external surface of the sealing valve at the open end.

2. The quick release connector as claimed in claim 1, wherein
  the body has
    a limiting groove formed around the external surface of the body at the holding end; and
    a limiting ring mounted in the limiting groove of the body; and
  the outer sleeve has an abutting recess formed in the internal surface of the outer sleeve at the pushing end with a bottom selectively abutting the limiting ring of the body to keep the outer sleeve from escaping from the body.

3. The quick release connector as claimed in claim 2, wherein
  the body has an abutting flange formed on the external surface of the body near the middle of the body; and
  the pressing spring is mounted around the body between the abutting flange and the spring recess.

4. The quick release connector as claimed in claim 3, wherein
  the body has
    a sealing ring mounted in the mounting recess of the body and abutting against the protruding face of the mounting recess; and
    a washer mounted in the mounting recess of the body and abutting the sealing ring;
  the sealing valve is movably mounted in the body and selectively abuts the sealing ring of the body; and
  the closed end of the sealing valve is mounted in the air inlet chamber of the body via the sealing ring and the washer.

5. The quick release connector as claimed in claim 4, wherein
  the body has multiple holding pins securely and transversally mounted in the air outlet chamber of the body to hold the washer and the sealing ring securely in the mounting recess; and
  one end of the returning spring abuts the holding pins and the other end of the returning spring abuts the external surface of the sealing valve near the open end.

6. The quick release connector as claimed in claim 5, wherein the body has a threaded segment formed in the internal surface of the body near the connecting end to screw with an air compressor.

7. The quick release connector as claimed in claim 5, wherein the body has a threaded segment formed on the external surface of the body near the connecting end to screw with an air compressor.

8. The quick release connector as claimed in claim 1, wherein
  the body has a sealing ring mounted in the mounting recess of the body and abutting against the protruding face of the mounting recess;

a washer mounted in the mounting recess of the body and abutting the sealing ring; and multiple holding pins securely and transversally mounted in the air outlet chamber of the body to hold the washer and the sealing ring securely in the mounting recess;

the sealing valve is movably mounted in the body and selectively abuts the sealing ring of the body;

the closed end of the sealing valve is mounted in the air inlet chamber of the body via the sealing ring and the washer; and one end of the returning spring abuts the holding pins and the other end of the returning spring abuts the external surface of the sealing valve near the open end.

9. The quick release connector as claimed in claim 1, wherein the body has a threaded segment formed in the internal surface of the body near the connecting end to screw with an air compressor.

10. The quick release connector as claimed in claim 1, wherein the body has a threaded segment formed on the external surface of the body near the connecting end to screw with an air compressor.

* * * * *